April 23, 1968  A. W. BARKER ET AL  3,379,055
FUEL EFFICIENCY METER
Filed Dec. 16, 1965  2 Sheets-Sheet 1
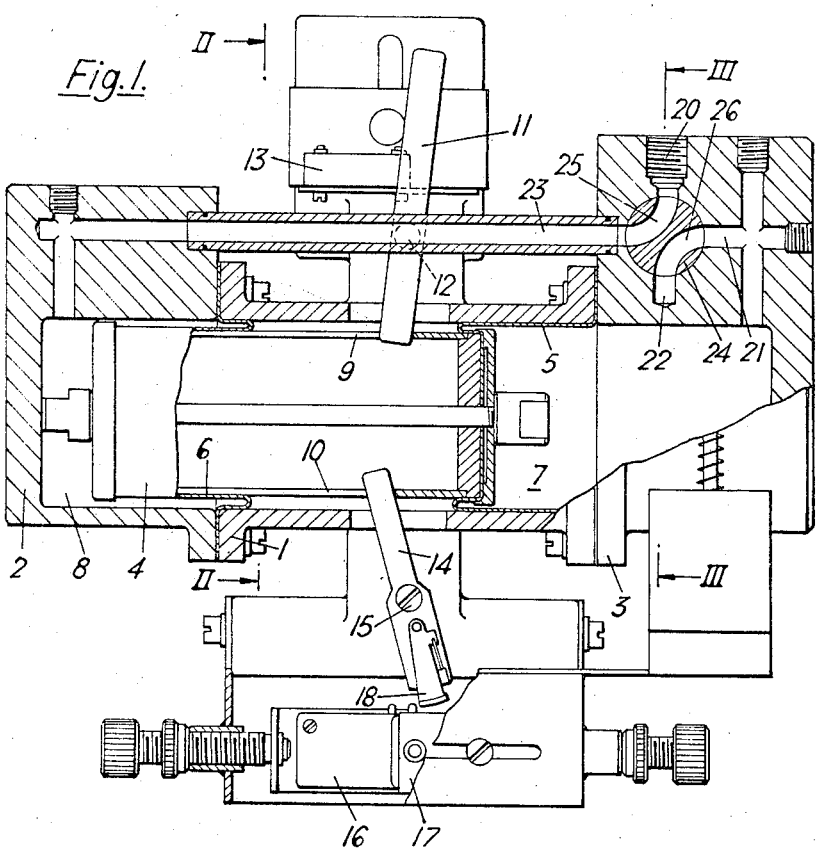
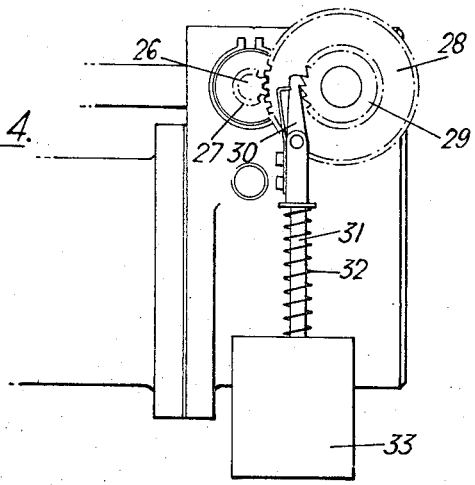
Inventors:
ALFRED WALTER BARKER
FRANK RAMSAY
By
Kurt Kelman
AGENT

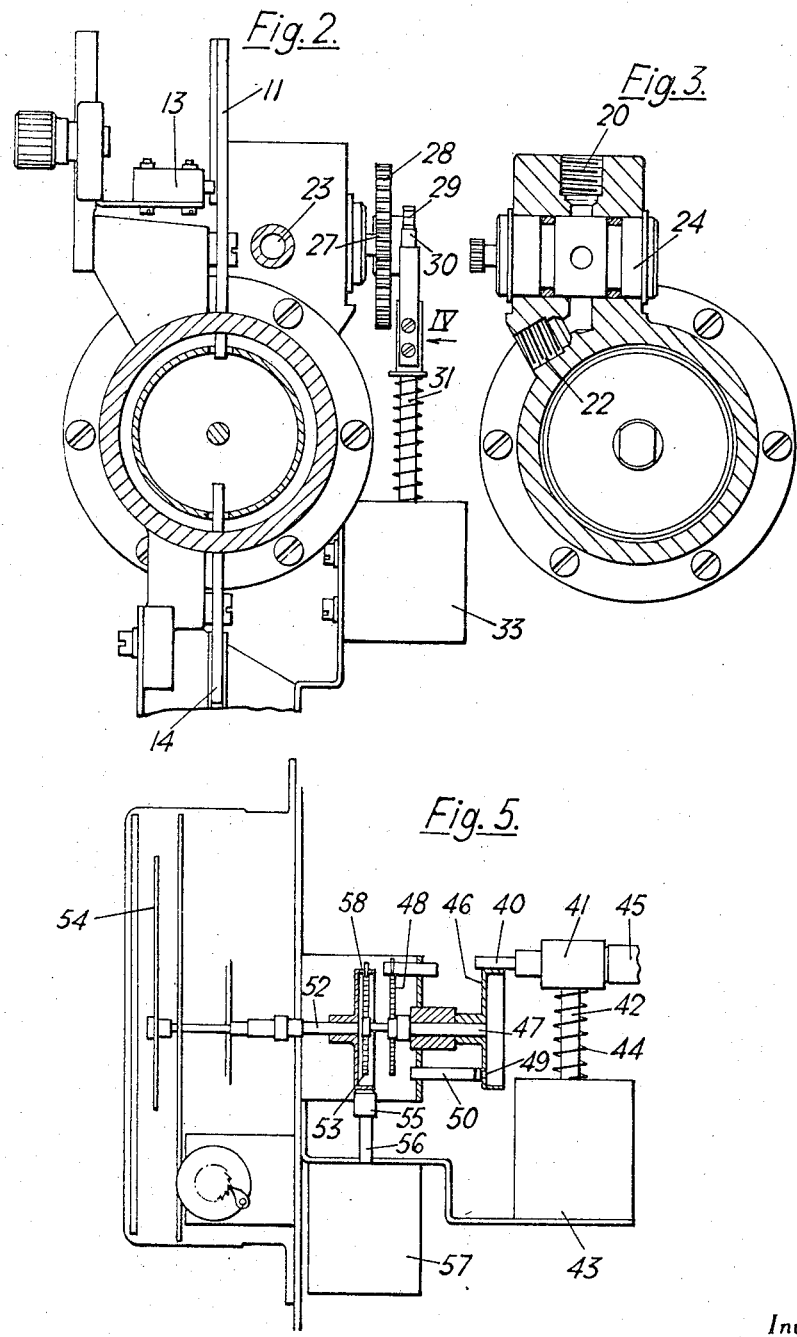

United States Patent Office 3,379,055
Patented Apr. 23, 1968

3,379,055
FUEL EFFICIENCY METER
Alfred W. Barker and Frank Ramsay, Bletchley, England, assignors to The Sandall Precision Co. Ltd., Bletchley, England, a British company
Filed Dec. 16, 1965, Ser. No. 514,312
Claims priority, application Great Britain, Dec. 18, 1964, 51,512/64
1 Claim. (Cl. 73—113)

ABSTRACT OF THE DISCLOSURE

A device for indicating miles per gallon or the like in which an indicating needle moved by a torsion spring is periodically repositioned according to distance traveled and fuel flowrate.

---

This invention concerns fuel efficiency meters and has for its object the provision of a simple and reliable fuel efficiency meter adaptable to a number of purposes such as, for example, determination of the fuel consumption of an internal combustion engine in terms of the work done by that engine, a particular application of the invention being the provision of a continuously-indicating miles per gallon meter for motor road vehicles.

Thus, in one aspect the present invention provides a fuel efficiency meter comprising a positive-displacement liquid metering mechanism adapted to be responsive to volumetric liquid fuel flow therethrough to generate a signal significant of the passage through such mechanism of a selected unit volume of fuel; work-measuring means adapted to determine work done in each interval between successive signals generated by said metering mechanism; and indicating means for displaying during each said interval, the work done in the preceding interval as determined by said work-measuring means.

The values displayed by said indicating means, it will be understood, are representative of work done per unit volume of fuel passing through the metering mechanism. If, therefore, the metering mechanism is arranged to determine the fuel flow to an internal combustion engine the displayed values may be in terms of work done per gallon or per heat unit by suitable calibration of the indicating means.

The work-measuring means may be adapted to measure various chosen parameters. For instance, in the case of an internal combustion engine driving an electricity generator the work-measuring means could determine generated electrical power (for example watt/hours) units so as to provide for the display of fuel efficiency in terms of such power units per gallon of fuel.

In the particular case of a motor road vehicle, the work-measuring means desirably determine distance travelled by the vehicle so as to provide for the indication of miles per gallon values of fuel efficiency.

According to one feature of this invention said metering mechanism may comprise one chamber housing a reciprocable member which divides the chamber into two sealed spaces, each said space being provided with means to permit ingress or egress of fuel, such means being connected fluid-tightly to valve mechanism, fluid passing through said metering mechanism being fed into the spaces in such a way that fluid entering one cylinder will force the reciprocable member to move and to cause an equal volume of fluid to leave said other cylinder, such reciprocable member being associated with means which respond to movement thereof.

According to yet a further feature of this invention said spaces may be formed by the reciprocable member which carries at each of its ends a rolling diaphragm secured also to the respective ends of the body defining the chamber.

Desirably said means which respond to movement of the reciprocable member may comprise at least one rockable lever adapted to be engaged by the reciprocable member. Very conveniently two such levers may be provided, one of the levers being adapted to actuate switch means which control said valve mechanism and the other being adapted to actuate switch means which control one or more integers of the work-measuring means.

According to yet a further feature of this invention said valve mechanism may comprise a rotatable body provided with conduits capable of linking when desired, at least two alternative conduits provided in the metering mechanism.

Where the meter according to this invention is provided to indicate the miles travelled by a road vehicle per gallon of fuel, said work-measuring means may conveniently comprise a distance-recording instrument adapted to be connected to the cable normally driving, or being associated with, the speedometer or mileage-recording instrument of such vehicle, this cable being adapted to energise conveniently through the intermediary of a first spindle, a torsion spring which is secured to a normally locked but releasable second spindle carrying an indicating needle of said indicating means.

Very conveniently rotation of said cable is not transmitted to the second spindle except when said connecting device or coupling is energised.

Advantageously means may be provided to permit only momentary release of the normally locked second spindle.

Whilst said fuel metering mechanism and work-measuring means may very advantageously be operatively coupled to one another as set out hereinbefore, such fuel metering mechanism may conveniently be operatively coupled to a counting device such as, for example, an electric pulse-operated counter and, thus, according to another aspect of this invention there is provided a fuel flow meter comprising a positive-displacement liquid metering mechanism adapted to be responsive to volumetric liquid fuel flow therethrough to generate a signal for a counter, such signal being significant of the passage through such mechanism of a selected unit volume of fuel so that the total volume of fuel passing through said metering mechanism is recorded.

In order that this invention may be more readily understood one embodiment of fuel efficiency meter particularly suitable for indicating the number of miles travelled by a vehicle per gallon of fuel fed to the engine of such vehicle will now be described by way of example and with reference to the accompanying drawings in which:

FIGURE 1 is a vertical medial part-sectional view through a positive-displacement fuel metering mechanism of the meter;

FIGURE 2 is a section on the line II—II of FIGURE 1;

FIGURE 3 is a section on the line III—III of FIGURE 1;

FIGURE 4 is a view in the direction of arrow IV of FIGURE 1; and

FIGURE 5 is a vertical medial section of a distance recorder of the efficiency meter which constitutes a work-measuring means.

In this embodiment the meter comprises two primary parts, namely a positive-displacement fuel metering mechanism shown in FIGURES 1 to 4 and work-measuring means in the form of a distance recorder shown in FIGURE 5, such metering mechanism including a rotary valve mechanism. The metering mechanism includes means to transmit certain actions of the fuel metering device to said distance-recording instrument so that an indication in the form of miles travelled by the vehicle, to which the meter is fitted, per gallon of fuel fed to the engine thereof is given by the meter.

The said fuel metering device comprises a hollow body formed by three separate parts 1, 2 and 3 of a light alloy which, when assembled, provide a central closed hollow portion.

Provided within this hollow portion is a cylindrical member 4 which has its two ends attached to rolling diaphragms designated 5, 6 which are connected to the body so that two closed spaces 7, 8, each having a swept volume of 6¾ cubic inches, are formed.

Thus, the total swept volume of both cylinders 7 and 8 equals 13½ cubic inches and therefore equals 1/20 of a gallon of fuel.

Provided in the wall of the member 4 are a pair of elongate slots 9, 10, the slot 9 being provided to permit a valve mechanism control lever 11 to enter the member 4. The lever 11 extends from said member 4 through the part 1 of the body and is pivotally connected at 12 near its midpart to the body of an electrical micro-switch mechanism. The arrangement is such that this lever responds to movement of the member 4 and is rocked from one position to another whenever it is engaged by one or other of the ends of the member which define the ends of the slot 9. Such movement causes momentary actuation of said micro-switch mechanism designated 13.

On the outside of the body, at a position diametrically opposite said switch mechanism 13, is a second lever 14 which is provided for controlling through the intermediary of electrical circuitry certain integers of said distance recorder.

Like the valve mechanism control lever 11 this lever 14 is pivotally supported substantially midway along its length at 15. One end portion of this lever 14 extends through the slot 10, the length of which is less than the slot 9.

The lever 14 controls a pair of electric micro-switches 16, 17 positioned on the arc swept by the end of the lever 14 outside the body when such lever 14 is rocked about its pivot 15. The second lever 14 is formed in two parts, one part designated 18 being pivotally connected to the remainder of the lever 14, a hair-spring being provided to bias the two parts into a position substantially co-axial with one another. This arrangement is provided to ensure that said micro-switches will be sequentially operated when the lever 14 is rocked in one direction but to permit the part 18 of the lever to move with respect to the other part, thereby enabling the lever inoperatively to glide over the micro-switches without operating the same in the other direction. The two switches are provided respectively to control a connecting device in the form of a friction coupling in the distance-recording instrument and a brake-unlocking device. The electrical connections between these switches and the devices they control are such that the electrical circuits are affected by the switches only when the second lever is operatively in engagement with the switches. The relative positions of the switches are arranged so that the second lever 14 engages and disengages the switch 16 controlling the brake-unlocking device before engaging the switch 17 which controls the friction coupling. The parts of the distance-recording instrument will be described in more detail hereinafter.

The switch mechanism 13 is provided to control the rotary valve mechanism referred to hereinbefore.

This valve mechanism is formed within the part 3 of the body of the fuel metering device and this part 3 is formed with four conduits 20, 21, 22 and 23, all of which terminate as ports in the wall of a bore which houses a rotatable body 24 traversed by a pair of conduits 25, 26, the arrangement being such that, depending upon the relative position between the body 24 and the part 3, either conduits 20 or 21 may respectively be placed into communication with conduits 23 and 22 or, alternatively, conduits 20 and 21 may be placed into communication with one another while conduits 22 and 23 communicate with one another.

The body 24 is carried on a spindle 26 which is provided with a small pinion 27 which is provided with twenty teeth and this pinion is engaged by a gear wheel 28 with one hundred and sixty teeth. Such gear wheel 28 has a ratchet wheel 29 mounted thereon, such ratchet wheel 29 having thirty-two teeth. The ratchet wheel 29 is engaged by a reciprocably movable spring-biassed pawl 30 carried by an armature 31, said armature being movable, against the action of a helical compression spring 32, on energisation of an electro-magnet 33 to cause rotation of the ratchet wheel 29. The action of the electro-magnet 33 is controlled by the switch mechanism 13, the latter being actuated in response to movement of the lever 11 by the member 4.

It should be noted that with the particular numbers of teeth on the various wheels 27, 28 and 29 a single movement of the armature 31 on energisation of the electro-magnet 33 will result in the rotatable body 24 moving through an angle of 90°.

Thus, each time the member 4 reaches the end of a stroke, i.e. the end of its travel in one direction, switch mechanism 13 will actuate the electro-magnet 33 and the body 24 will rotate through an angle of 90°.

When the meter is positioned on a vehicle the conduit 20 is connected into the fuel supply line of the vehicle, for example adjacent the fuel pump, whilst conduits 21 and 23 are respectively in communication with the cylinders 7 and 8. Conduit 22, on the other hand, is connected to the carburetor or, if provided, to the fuel injection device on the engine of the vehicle.

As the average fuel pump usually operates at low pressures the fuel metering mechanism has been described as using rolling diaphragms, but it should be appreciated that with higher pressure pumps, such as are used with fuel injection devices, the cylindrical member 4 may be dimensioned to constitute a piston and may carry piston or O-rings.

Before describing the passage of fuel from the fuel supply line through the fuel metering device and the valve mechanism to the vehicle engine, the construction of the work-measuring means, which, as stated hereinbefore, is in the form of a distance-recording instrument, will be described.

The preferred arrangement of distance-recording instrument comprises a driving shaft 40 axially rotatable in a bush 41, said bush 41 being carried by an armature 42 movable from an inoperative position to an operative position by an electro-magnet 43, a helical spring 44 being provided to bias the armature into the inoperative position. One end of the shaft 40 is connected to a rotating cable 45 associated with the speedometer and mileage recorder of the vehicle, while the other end of such shaft is adapted to be moved transversely by the armature 42, when the electro-magnet 43 is energised, into engagement with a driving wheel 46, to constitute a friction coupling therewith, said driving wheel 46 being rigidly carried on a first spindle 47, such spindle 47 being biased by a spiral spring 48 towards a starting position in which a lug 49 projecting radially therefrom lies against a fixed member 50 carried by the bearing 51 locating the spindle 50.

The end of the spindle 47 remote from the electro-magnetic clutch is connected to a second spindle 52 through the intermediary of a second spiral torsion spring 53. This second spindle 52 carries an indicating needle 54 which is adapted to move across a scale arranged to indicate to the driver of the vehicle the number of miles driven per gallon of fuel used. This said second spindle 52 is adapted normally to be locked against rotation by a brake shoe 55 carried by an armature 56 controlled by a further electro-magnet 57, the arrangement being such that the brake shoe is thrust into a locking position against a drum 58 on said second spindle whenever the electro-magnet is energised.

The said electro-magnets 43 and 57 of the friction coupling and the brake shoe for the second spindle are respectively connected, through the intermediary of the various electrical circuits, to said sequentially operated micro-switches 16, 17. The first of the two switches designated 16 to be operated is electrically connected to the brake-controlling electro-magnet 57 and the other switch 17 to the friction coupling electro-magnet 43.

The indicating needle and scale are housed within an instrument case which includes a normal electrical pulse-operated counter for reading the volume of fuel used by the vehicle over a particular journey or journies, this counter being provided with a device for resetting the same to zero. The micro-switch 17, in addition to controlling the brake shoe 55, also makes and breaks the electrical circuit controlling the counter so that electric pulses are fed to the counter in proportion to the fuel used.

It should be appreciated that the fuel metering mechanism may, if desired, be coupled only to such a counter and not to the distance recorder in order that only an accurate indication of the fuel used by the vehicle may be obtained. As is well-known, an accurate indication is not obtainable from the normal relatively inaccurate fuel gauges provided on motor vehicles.

In operation, therefore, when the ignition circuit is closed and the engine of the vehicle is started actuation of the fuel pump (which in this case be assumed to be electrically operated) will cause fuel to be forced into one or other of the inlet ports of the cylinders depending upon the position of the rotatable valve body 24. Assuming the position to be that shown in FIGURE 1 of the drawings the fuel will be forced through the conduit 20, through conduits 25 and 23 into the space 8. The flow of fuel into this space 8 will cause the cylindrical member 4 to move towards the space 7 and such movement will cause the rolling diaphragm 5 attached thereto to force fuel already in the space 7 (due to the previous stroke thereof) out of such space through the outlet port therein and along the conduit 2 leading towards the engine of the vehicle.

When the member 4 reaches the end of its stroke, that is when space 8 is filled with fuel, the rockable lever 11 riding in the slot 9 engages one end of such slot and such lever is forced to rock and such rocking movement causes the switch mechanism 13 to be operated and the electro-magnet 33 is energised. Such energisation of the electro-magnet 33 causes the armature 31 and pawl 30 to move against the action of the spring 32 and to rotate the ratchet wheel 29. Such rotation of the ratchet wheel is transmitted to the rotatable body 24 and the numbers of teeth on the gear wheels are such that the body 24 moves through an angle of 90° so that conduits 20 and 21 communicate with one another through conduit 25 and conduits 22 and 23 communicate with one another through conduit 26. It should be appreciated that fuel will now flow from the conduit 20 into the space 7 through conduits 25 and 21 and the member 4 will move as a result of fuel filling the space 7 so that fuel in space 8 will be discharged along conduits 23, 26 and 22 towards the engine of the vehicle.

Once the space 8 has been discharged of fuel the rocking lever 11 causes the switch mechanism 13 to be moved again and fuel from the pump again enters the space 8 through conduits 20, 25 and 23 so that the above described reciprocable movement of the reciprocable member is repeated. Each time both spaces 7 and 8 are emptied of all fuel 1/20 of a gallon of fuel will have been fed to the engine of the vehicle.

During the two strokes of the reciprocable member necessary to allow discharge of fuel from both of the spaces 7, 8 and to permit 1/20 of a gallon of fuel to pass to the engine of the vehicle, the said lever 14 will have moved past the two said micro-switches 16 and 17 on two occasions. However, owing to the two-part construction of the said lever the two micro-switches 16, 17 will have been operated sequentially on one occasion only. Such operation of the micro-switches 16, 17 causes the brake shoe 55 to be momentarily released and re-applied to the said second spindle and then for the friction coupling momentarily to be disengaged and re-engaged. The offset of this momentary sequential release of the first and second spindles will become apparent from the following description.

It will be appreciated that, once the vehicle's gears are engaged and the vehicle set in motion, the said distance-recording instrument will be actuated.

As has been stated hereinbefore the arrangement between the electrical micro-switches 16, 17 and the electro-magnetically-operated friction coupling and the brake are such that normally when the engine of the vehicle is started such electro-magnets are energised and, in consequence, the driving shaft 40 and the driving wheel 46 engage one another. The relative diameters of the shaft 40 and driving wheel 46 are so chosen that the wheel 46 and spindle 47 rotate through 360° in every three miles travelled by the vehicle. Assuming that the vehicle is moved immediately the engine is started (with the electro-magnet coupling energised), the driving shaft 40 which will be connected to the driving wheel 46 will rotate and, in consequence, the first spindle 47 carrying the driving wheel 46 will also rotate. The spring 53 connected to the first spindle 47 and the drum 58 of the normally locked second spindle 53 will thus be energised to an extent dependent upon the amount of rotation of the first spindle 47.

In view of the fact that the electro-magnet 57 controlling the brake shoe 55 is normally energised and causes the shoe to be engaged on the drum, the second spindle 52 is normally locked against rotation, but once this electro-magnet 57 is de-energised and the brake shoe 55 released the second spindle 52 will be freed and the torsion in the energised torsion spring 53 connected thereto will cause the second spindle 52 also to rotate and the indicating needle carried thereby will rock to a position dependent on the amount of rotation of the second spindle under the influence of the partially wound-up or energised torsion spring 53. While the second spindle 52 is locked the torsion spring 53 will be energised as a result of rotation of the first spindle 47 until the electro-magnet of the coupling connecting the cable 45 to the driving wheel 46 on the first spindle is de-energised. Because of the arrangement of the two micro-switches 16, 17 such de-energisation of the coupling electro-magnet 43 does not occur until the brake micro-switch 17 is actuated by the rocking lever, namely until the brake electro-magnet 57 has been momentarily de-energised, de-energisation of the coupling electro-magnet 43 occurring after the fuel which has entered one space is forced out from said space by fuel entering the other space.

The said momentary de-energisation of the brake electro-magnet 57 unlocks said second spindle which carries the indicating needle 54 so that the second spindle may move to a new position under the influence of the spring 53. The brake is re-applied to lock said second spindle after a momentary lapse in time sufficient to permit the indicating needle to reach its new position.

It is clear that if the indicating needle 54 were attached directly to the second spindle without providing an electro-magnetic brake 55 the needle would, immediately before de-energisation of the electro-magnetic coupling between shaft 40 and wheel 46, have arrived at a position on the scale which would be dependent upon the miles travelled by the vehicle per gallon of fuel. However, an arrangement would be unsatisfactory where the needle 54 was not locked in this position, in view of the fact that it would be necessary for the driver of the vehicle to look at the indicating needle 54 at exactly the moment at which it arrives at this position. It is for this reason, therefore, that it is necessary to arrange for the indicating needle 54 normally to be locked by the brake shoe 55 so that the said indicating needle remains in the position indicating the miles travelled per gallon of fuel for a sufficient length of time for the driver to observe the reading.

Once the electro-magnet 43 of the coupling is de-energised the first spindle is permitted to return to its original rotating position under the influence of the spring 48 which is secured thereto.

Continued movement of the vehicle would then cause the said electro-magnet 43 of the coupling to be re-energised and the spring 53 connecting the first and second spindles to one another may then be again wound-up or re-energised by an amount dependent upon the distance travelled between actuation of the micro-switches by the said second lever.

It will be understood that the extent of deflection of the needle between successive actuations of the said switch controlling the coupling electro-magnet will be dependent, and will be directly proportional to, the extent of rotation of said first spindle and thus will be dependent upon, and will be directly proportional to, the distance travelled by the vehicle.

Between successive actuations of the said micro-switches 16, 17 controlling the electro-magnet of the coupling and brake (as a result of the lever asosciated therewith only engaging the same operatively when the lever is moved in one of two directions) both the first and second spaces 7, 8 of the fuel measuring device are discharged of fuel and the volume of fuel passed to the engine will be equal to the sum of the volumes of the cylinders, namely 1/20 of a gallon. Thus, the indication given by the indicating needle will represent the distance travelled by the vehicle while using the volume of fuel contained in the two spaces 7, 8. It will be appreciated, therefore, that by appropriate calibration of the scale the miles travelled per gallon of fuel may be indicated directly on the scale of the meter by the indicating needle.

Furthermore, it will be appreciated from the above description that the distance covered by the vehicle between successive actuations of the micro-switches and, in consequence, the time elapsing between de-energisation of the electro-magnets of the brake and coupling and repositioning of the indicating needle will be dependent upon the speed of the car and, thus, upon the distance covered on the volume of fuel contained by the two cylinders.

The convenient volume for each cylinder of 6¾ cubic inches is selected so that the time between readjustment of the indicating needle is neither too short at a high speed and/or high fuel consumption nor too long at a low speed and/or low fuel consumption. The driver of a vehicle is only able to glance occasionally at any one of the instruments on the dashboard of the vehicle and an indicator which has a rapidly changing and/or oscillating reading is of little use and, thus, there is little point in making the volume of the cylinders of the fuel-measuring device very small. On the other hand, however, if such cylinders have a large volume the meter will not be able to indicate the true rate of fuel consumption during a very short journey. In consequence, as has been stated above, in this particular embodiment each cylinder has a swept volume of 6¾ cubic inches so that 13½ cubic inches or 1/20 of a gallon of fuel pass through the fuel-measuring device to the engine between successive actuations of the micro-switch 16.

In such an arrangement, assuming that a vehicle is travelling at 45 miles per hour consuming fuel at a rate of 30 miles per gallon, an indication of the average consumption would be given every two minutes. Should the vehicle speed then be increased to 90 miles per hour it is probable that its fuel consumption would go up considerably and it may be assumed, for example, that such consumption is 15 miles per gallon. On this basis 1/20 of a gallon would then be used up over a period of 30 seconds. Therefore, with this speed and this consumption an indication of the average consumption would be given every 30 seconds. This arrangement gives the driver sufficient time to glance at his instrument which will be indicating the average fuel consumption over the length of road which he has just passed.

The degrees of rotation of the first spindle between successive actuations of the micro-switches 16, 17 are directly proportional to the miles travelled by the vehicle on one gallon of fuel. Thus, if the miles travelled by the vehicle per gallon of fuel remains the same between a series of successive actuations of the micro-switches 16, 17 the torsion spring 53 will, between each successive actuation of the micro-switches, have been wound-up or energised by the first spindle 47 by an equal amount and the needle 54, when released by de-energisation of the brake electro-magnet 57, will remain at the same position on the scale of the meter. If, on the other hand, the miles travelled by the vehicle per gallon drops then the indicating needle will, when released, take up a new position because the spring 53 connecting the first and second spindles 47, 52 will not be sufficiently wound-up or energised to retain the indicating needle in its old position and, thus, the needle will rock until the partly energised spring restrains further movement thereof. Similarly, if the miles travelled per gallon of fuel increases then the spring will be further wound-up and energised, and the indicating needle will rock in the opposite direction under the influence of the torsion spring when such needle is released.

With this arrangement it will be appreciated that, except for the brief period during which the indicating needle is reset such indicating needle indicates at all times the miles travelled by the vehicle per gallon of fuel during the immediately previous successive actuations of the first micro-switch.

The speeding motorist is unconscious of the fact that the consumption of fuel at an excessive speed is enormous and a great advantage of this invention is that it will have the effect that the motorist will travel at a more reasonable speed merely as a result of the fact that such motorist can readily see that fuel consumption is very much less in a lower speed range. It will certainly have the effect of deterring the motorist from driving with a fully opened throttle.

As has been stated, the fuel metering device may be coupled to an electrical pulse-operated counter merely for recording a total volume of fuel used over a journey of known mileage. Such a device is required particularly by companies operating fleets of lorries where large quantities of fuel are invoiced as having been used by the lorries when such fuel has, in fact, been sold fraudulently by the drivers of the lorries to other road users.

It is appreciated, however, that even with the suggested system of recording the volume of fuel used by the vehicle an astute driver could find ways of causing the recording meter to record a volume of fuel which is not in fact passed through the fuel metering device by, for example, subjecting the meter to a series of electrical pulses from a separate electricity power source. However, careful positioning of the pulse-operated meter and its associated electric circuitry could overcome this difficulty. Alternatively, a bi-metallic strip may be fitted in series with the electro-magnet of the solenoid which operates the counter so that if there was a quick succession of electrical pulses the strip would trip the electric circuit and cause the illumination of a warning light which indicates that interference had taken place. The arrangement may be that the bi-metallic strip could only be reset by a special key in the hands, for example, of a senior member of the company operating the fleet of lorries.

We claim:
1. A fuel efficiency meter comprising a positive-displacement liquid metering mechanism adapted to be responsive to volumetric liquid fuel flow therethrough to generate a signal significant of the passage through such mechanism of a selected unit volume of fuel; work-measuring means adapted to determine work done in each interval between successive signals generated by said metering mechanism; and indicating means for displaying during each said interval the work done in the preceding interval as determined by said work-measuring means, and said work-measuring means comprising a distance-recording instrument adapted to be connected to a cable normally driving, or being associated with, the mileage-recording instrument of the vehicle provided with a meter, by means adapted to energise a spring which is secured to a normally locked but releasable spindle carrying an indicating needle of said indicator.

References Cited
UNITED STATES PATENTS

| | | |
|---|---|---|
| 1,690,328 | 11/1928 | Gardeen. |
| 1,800,640 | 4/1931 | Jehle et al. _____ 73—113 |
| 2,619,076 | 11/1952 | Agin _____ 73—113 X |
| 2,685,198 | 8/1954 | Saul _____ 73—113 |
| 3,058,340 | 10/1962 | Martensson _____ 73—114 |
| 3,164,985 | 1/1965 | Arnot _____ 73—113 X |

RICHARD C. QUEISSER, *Primary Examiner.*

JAMES J. GILL, *Examiner.*

JERRY W. MYRACLE, *Assistant Examiner.*